Nov. 24, 1970          G. DEUTSCHLANDER          3,541,869
DEVICE FOR DRIVING A ROTATING PART AT AN ANGULAR VELOCITY
THAT VARIES DURING ONE COMPLETE REVOLUTION
Filed Nov. 14, 1968                        5 Sheets-Sheet 1

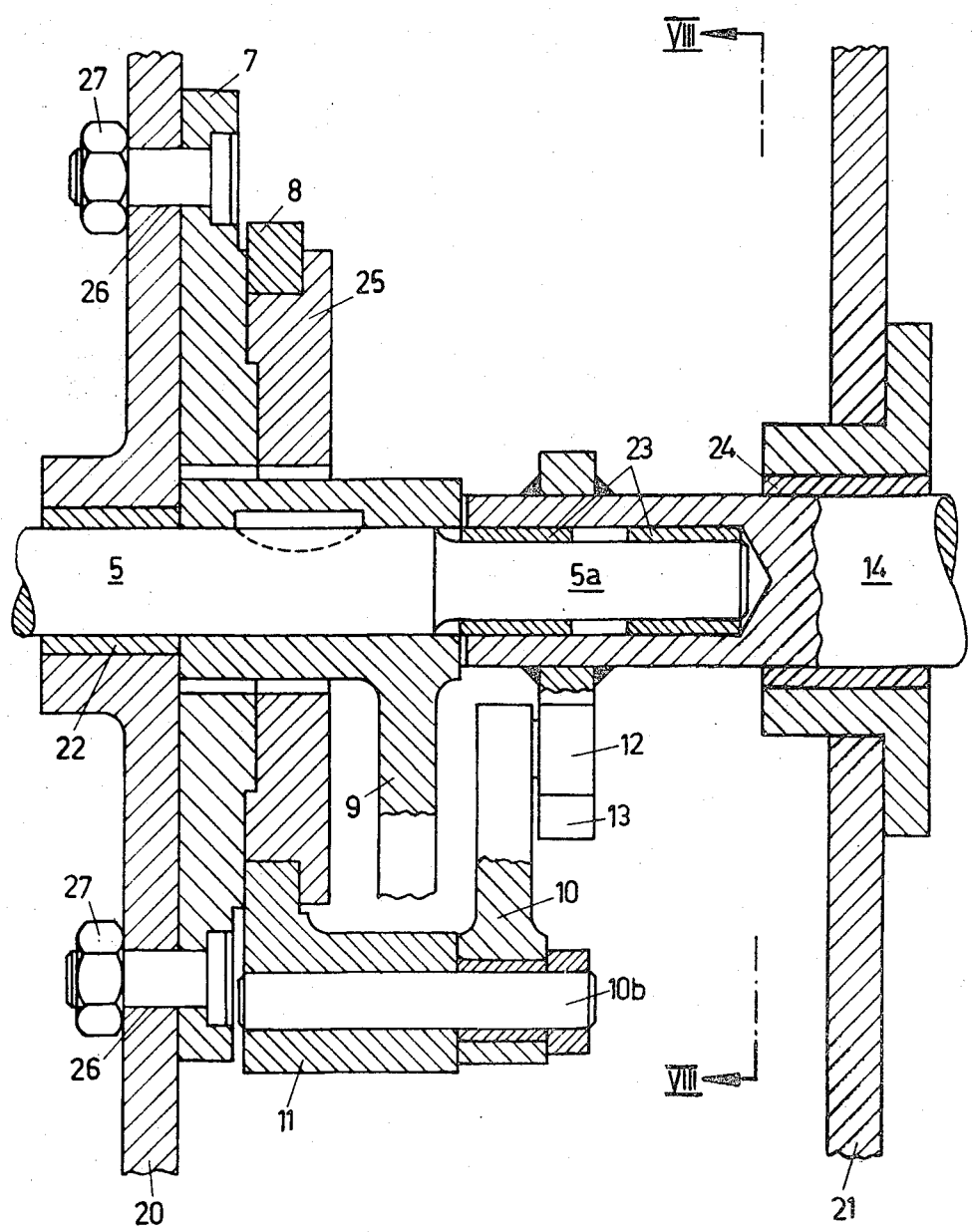

United States Patent Office 3,541,869
Patented Nov. 24, 1970

3,541,869
DEVICE FOR DRIVING A ROTATING PART AT AN ANGULAR VELOCITY THAT VARIES DURING ONE COMPLETE REVOLUTION
Gert Deutschlander, Neuhausen am Rheinfall, Switzerland, assignors to Schweizerische Industrie-Gesellschaft, Neuhausen am Rheinfall, Switzerland
Filed Nov. 14, 1968, Ser. No. 775,690
Claims priority, application Switzerland, Dec. 22, 1967, 18,092/67
Int. Cl. F16h 27/10
U.S. Cl. 74—63                                                  5 Claims

ABSTRACT OF THE DISCLOSURE

The corners of a triangular coupler are respectively pivotally connected to the drive shaft rotated at constant angular velocity, through a tang and fork to the driven shaft, to be rotated at a cyclically varying angular velocity, and to a lever rigidly connected to a rotatable ring mounted on a disk surrounding the drive shaft and adjustable about a fixed axis.

BACKGROUND OF THE INVENTION

The invention relates to a device, particularly useful for the rotating welding dies of wrapping machines, for turning a rotating part at an angular velocity that varies over a complete revolution.

Among the known wrapping machines are those that surround the spaced objects to be wrapped in a tube-like wrapper, which, in the space between neighboring objects, is pressed together between a pair of rotary welding dies, which form a cross-seam weld. As part of the same step, or in a later step, the wrapping is cut apart near the weld seam, forming the wrapped individual packages. It has been known that the output of wrapping machines of this kind could be increased by revolving the welding and cutting dies at a non-uniform angular velocity, the dies at first deaccelerating, so that at their lowest velocity, occurring while the seam is welded, their circumferential velocity is the same as the velocity of the wrapping, and then rotating as quickly as possible out of the way of the next object. To this end, differential gearing has been used in the drive for the welding and cutting dies, this gearing having to undergo various additional movements in order to obtain the desired variation in the angular velocity of the welding and cutting dies. This solution, however, is very expensive and complicated.

SUMMARY OF THE INVENTION

The purpose of the invention is to produce a device that produces the same results as does the prior art, but far more simply and at much less cost.

In a simple form, the device of the invention includes a drive shaft turned at a constant angular velocity, a lever mounted on the drive shaft and rotating therewith, a coupler having at least two spaced pivots, one of which is connected to the lever at the end thereof remote from the drive shaft, a further lever connected to the other pivot and revolvable in a curved path about an axis parallel to the drive shaft, a projection extending from the coupler, the positions of the projection and the two pivots respectively defining the three corners of a triangle, a fork engaged by the projection, and a driven shaft connected to the fork and mounted free to rotate about an axis coaxial with the drive shaft, whereby the driven shaft is turned at an angular velocity that varies over a complete revolution.

In a more elaborate form of the invention, the manner in which the angular velocity varies can be changed at will by adjusting the position of the axis about which the further lever revolves along a path that passes through the axis of the drive shaft. This adjustment enables the device to be adapted, for example, to objects of different sizes.

BRIEF DESCRIPTION OF THE DRAWING

This invention will be described, with reference to the figures of the drawings, wherein:

FIG. 7 is a side view, taken along line VII—VII of FIG. 8, of a practical embodiment of the invention.

DESCRIPTION OF THE PREFERRED EMBODIMENT

Figure 1A:
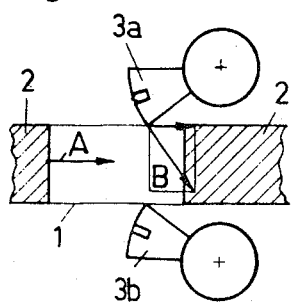
FIGS. 1a, 1b, and 1c schematically show the rotary welding and cutting dies in three different positions during a welding and cutting step executed in a wrapping machine.
Figure 1B:
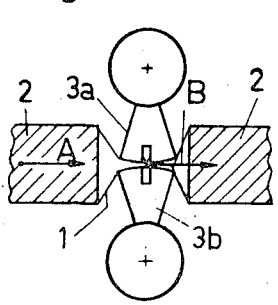
Figure 1C:
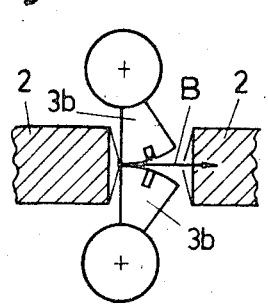

FIGS. 1a to 1c show a preferred application of the invention. An object 2 wrapped in a tube of thermoplastic material is moved at constant speed, indicated by the arrow A, between a pair of rotating welding and cutting dies 3a and 3b, the circumferential speed of which is indicated by the arrow B. The circumferential speed of these dies must be sufficiently reduced so that, during welding and cutting (shown in FIG. 1b), it equals the speed of the tube 1. But once the cross seam is welded, the dies 3a and 3b must be rotated as quickly as possible out of the path of the following object 2, as shown in FIG. 1c.

Figure 2:
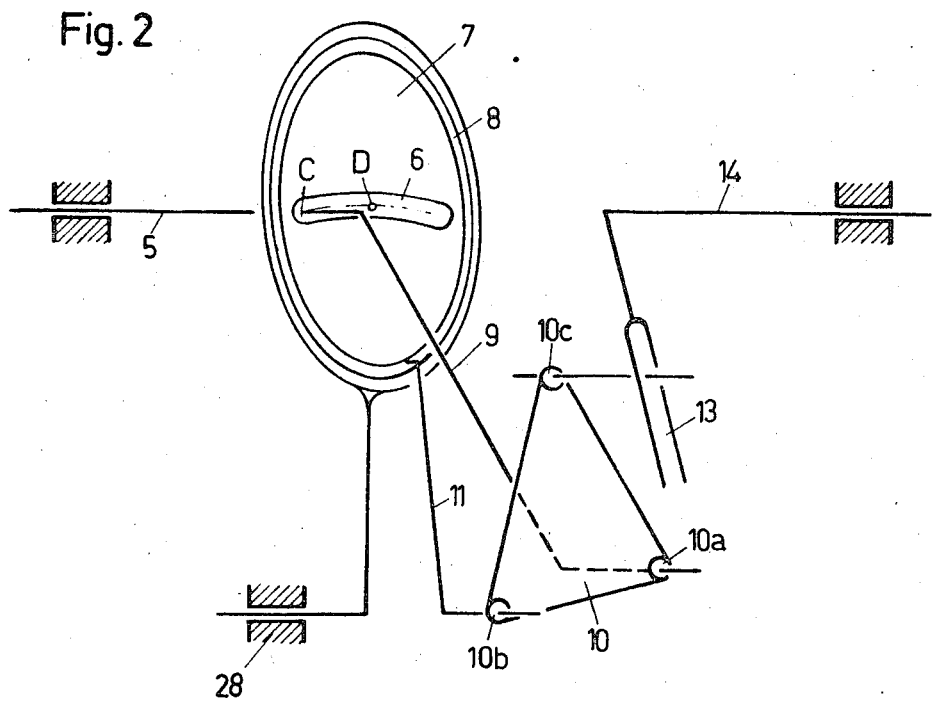
FIG. 2 is a schematic view of the invention.

The device of the invention, shown schematically in FIG. 2, is a relatively simple solution to the problem of converting the constant angular velocity of a drive shaft 5 into the variable angular velocity required by a driven shaft 14.

The drive shaft 5 passes through a slot 6 in a disk 7, on which a ring 8 is rotatably mounted. The disk is mounted in a pivot 28, so that it is free to swing, with respect to the shaft 5, the width of the slot 6, and can be fixed in a desired position. To the drive shaft is connected a lever 9, the end of which remote from the disk is articulately connected to a joint 10a of a coupler 10. A lever 11, at one end rigidly connected to the ring 8, is supported in another joint 10b of the coupler. The ring 8 is thus driven by the coupler through the lever 11, and it rotates about an axis D that is parallel to the drive shaft 5. The ring, as shown in FIG. 2, is eccentrically supported with respect to the shaft 5 by a distance CD. The joint 10c of the coupler 10 supports a tang 12 which engages a fork 13 supported by the driven shaft 14, which is coaxial with the shaft 5. The path along which the axis D is adjustable passes through the drive shaft axis.

During one complete revolution of the drive shaft 5 the coupler 10 turns about the joint 10a, thereby transmitting a rotational movement to the fork 13 and thus to the driven shaft 14. By suitably dimensioning the different parts of the device, the desired variable angular velocity is given to the driven shaft 14.

Figure 3:
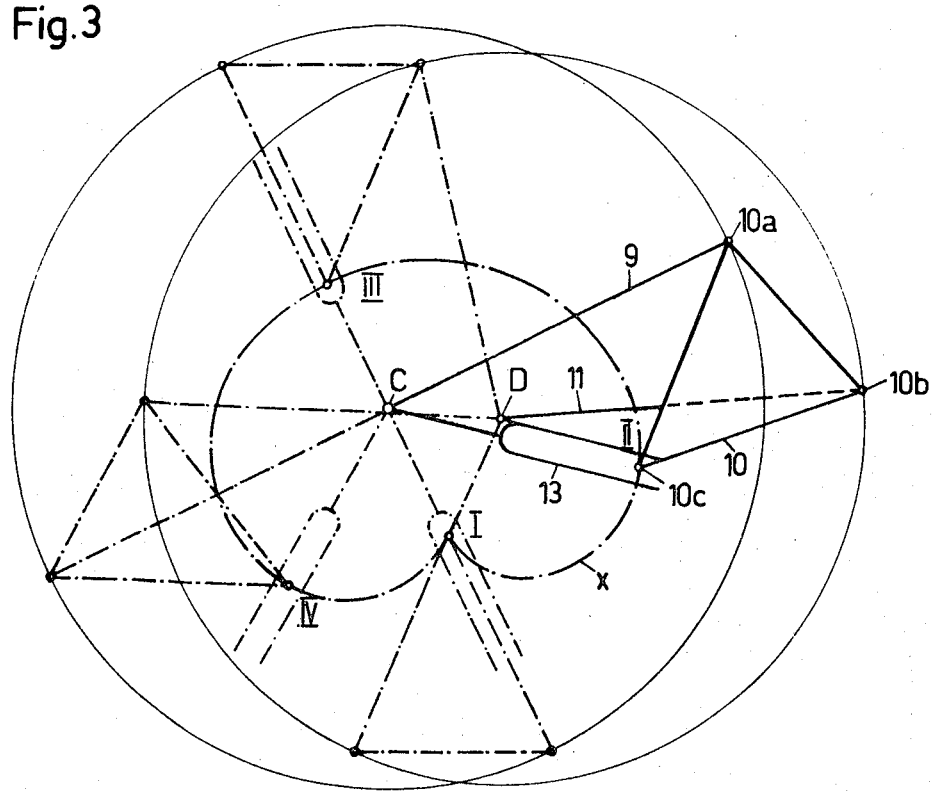
FIGS. 3, 4, and 5 schematically show the position taken by key parts during one complete revolution, for three different settings of the device illustrated in FIG. 2.
Figure 6:
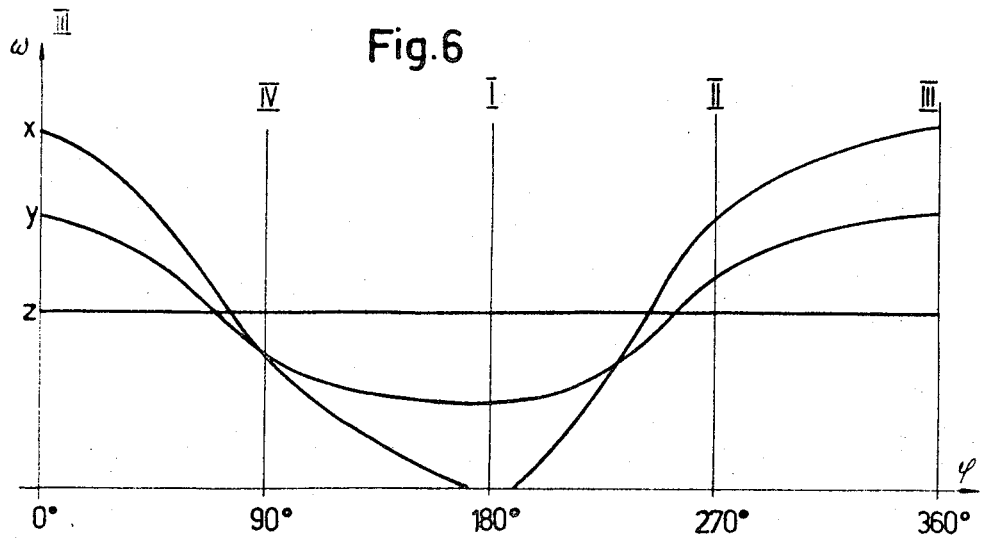
FIG. 6 is a graph showing the variation in angular velocity of the driven shaft over a complete rotation, for each of the three settings of FIGS. 3, 4, and 5.
Figure 4:
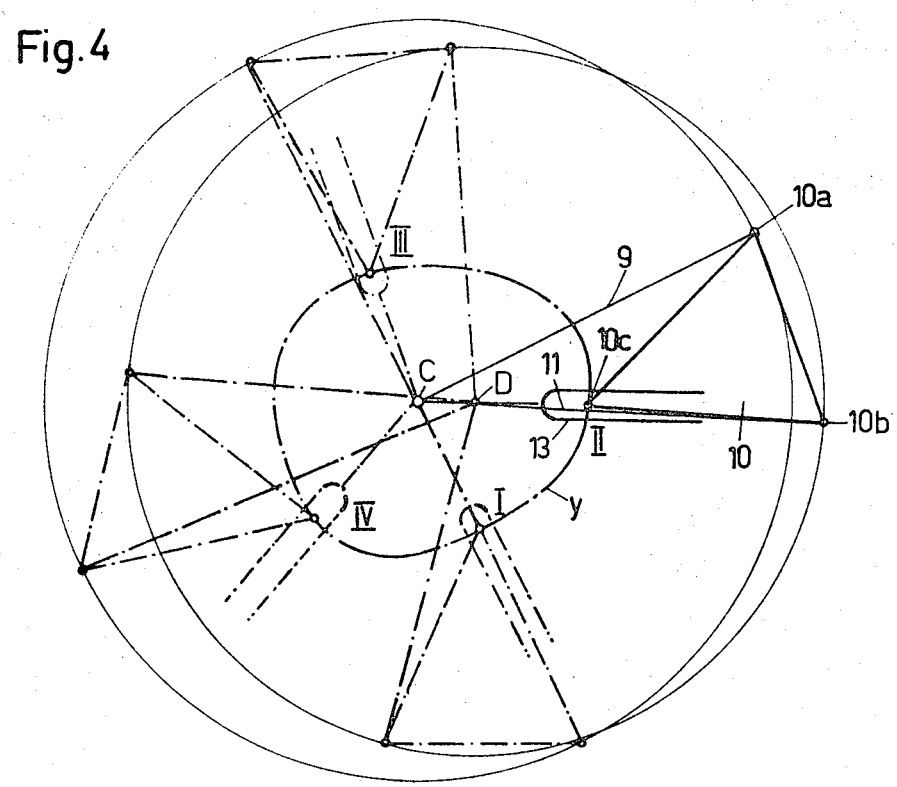
Figure 5:
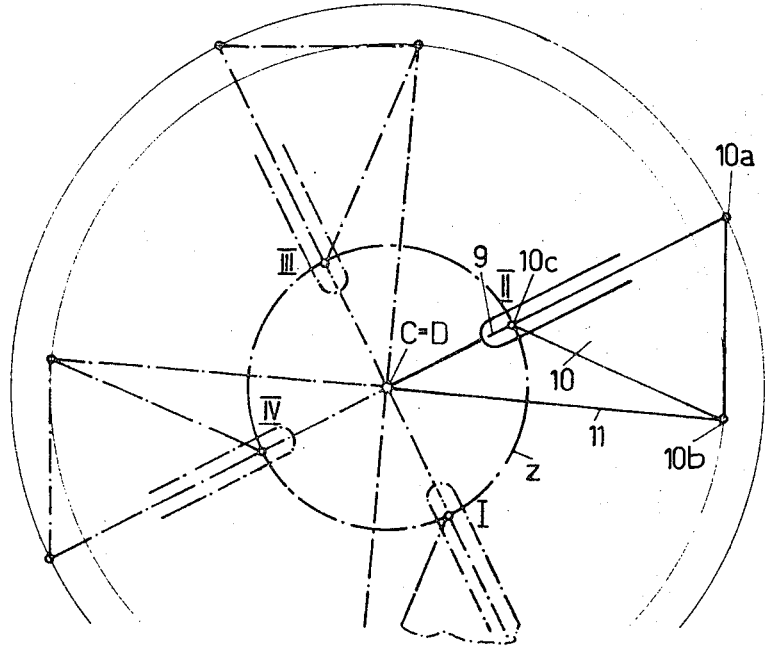
Figure 8:
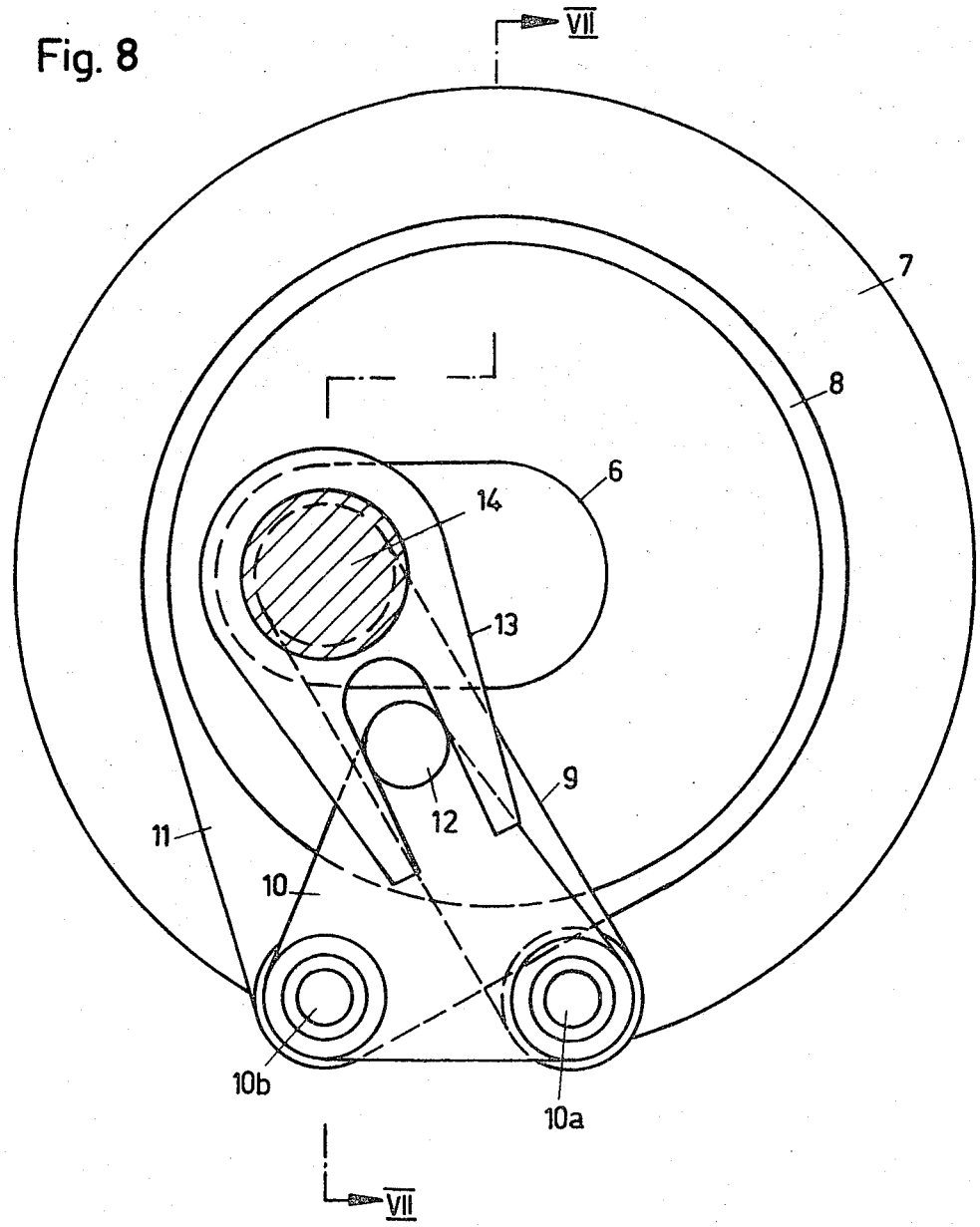
FIG. 8 is a view taken along line VIII—VIII of FIG. 7.

FIGS. 3, 4, and 5 schematically show the device illustrated in FIG. 2, with three different adjustments of the disk 7 with respect to the drive shaft. The drive shaft 5 and the driven shaft 14 extend perpendicularly to the planes of the drawings at point C. Point D indicates the axis of rotation of the ring 8. The curves X, Y, and Z describe the paths taken by the coupler joint 10c and the tang 12, during one complete rotation of the drive shaft. FIG. 6 shows, for each of the three adjustments of the disk 7, the variation in the angular velocity w of the driven shaft 14 over one complete revolution of the latter. The eccentricity of the disk 8 (point D) with respect to the shaft 5 (point C) is at its greatest in FIG. 3, whereas FIG. 5 illustrates the case in which the axis of rotation of the ring 8 and the axis of the drive shaft 5 are coaxial. In this latter case, the angular velocity of the driven shaft corresponds to that of the drive shaft; in other words, it is constant.

A practical embodiment of the invention is shown in FIGS. 6 and 7. The individual parts are given, insofar as possible, the same reference numerals as in FIG. 2. The device has two stationary plates 20 and 21. The drive shaft 5 rotates in a bearing 22 of the plate 20, and is rigidly connected to the lever 9. An end 5a, of reduced diameter, of the shaft 5 is mounted free to rotate in bearings 23 within the driven shaft 14. The latter is rotatably supported in a bearing 24 in the plate 21, and carries the fork 13 engaged by the tang 12. The end of the lever 9 remote from the disk 7 is connected to the coupler 10 by the joint 10a, which here, as well as the joint 10b, is more precisely called a pivot. The pivot 10b rotatably supports the coupler 10 and the lever 11. The latter forms an integral part with the ring 8. The ring 8, its support plate 25, and the disk 7 are positioned by first loosening the nuts 27 and then shifting the disk 7 in slots 26 of the plate 20. The disk 7 is thus caused to turn about the axis 28 (see FIG. 2), which extends perpendicularly to the place 20. The position of this axis is advantageously chosen so that the lowest angular velocity of the driven shaft is not appreciably shifted with respect to time, when adjustments are made. This requirement is fulfilled when the axis 28 lies in the path of the pivot 10b for a middle adjustment (as shown in FIG. 4) of the disk 7. In this way, all of the conditions are met that permit adjustments to be made while the device is in operation.

Although the preferred embodiment of the invention has been described, the scope of, and the breadth of protection afforded to, the invention are limited solely by the appended claims.

I claim:

1. A variable drive mechanism, particularly for welding dies in an article wrapping machine, comprising a drive shaft; mounting means supporting said drive shaft for rotary motion about its own axis at a constant angular velocity; a driven shaft; mounting means supporting said driven shaft for rotary motion about said drive shaft axis; a crank secured to said drive shaft for swinging movement therewith; crank means secured to said driven shaft and provided with a slot therein; lever means; support means mounting one end of said lever means for rotary movement of said lever means about an axis parallel with said drive shaft axis; coupler means disposed substantially transversely of said drive shaft axis; first pivot means pivotally connecting said coupler means with said crank; second pivot means pivotally connecting said coupler means with the other end of said lever means; and projecting means on said coupler means extending into said slot in the crank means and slidable therein; said first pivot means, second pivot means and projecting means being located one at each corner of a triangular figure, whereby said constantly rotating drive shaft rotates said driven shaft at an angular velocity that varies during a complete revolution of said driven shaft.

2. A variable drive mechanism as set forth in claim 1, in which said support means mounting said one end of the lever means is adjustable for varying distance of said lever means axis from said drive shaft axis.

3. A variable drive mechanism as set forth in claim 1, in which said lever means includes a ring, disk means supporting said ring for rotary movement about said axis parallel with the drive shaft axis, an arm fixedly connected with said disk means and having an end portion projecting therefrom, stationary support means pivotally supporting the projecting end portion of said arm for adjustment of the location of said parallel axis of the disk means in relation to said drive shaft axis, and locking means for locking said disk means in adjusted position.

4. A variable drive mechanism as set forth in claim 3, in which the pivot axis for said projecting end portion of the arm in said stationary support means lies in the path of said second pivot means.

5. A variable drive mechanism as set forth in claim 1, in which one end of said drive shaft is rotatably mounted in an end portion of said driven shaft.

References Cited

UNITED STATES PATENTS

| 3,286,536 | 11/1966 | Hallmann | 74—69 |
| 379,971 | 3/1888 | Miller | 74—69 |

WESLEY L. RATLIFF, Jr., Primary Examiner